United States Patent [19]
Brown

[11] 3,945,170
[45] Mar. 23, 1976

[54] EXTENSION OF SHELF LIFE OF FRESH PRODUCE

[76] Inventor: Rodney F. Brown, 11228 Arminta St., Sun Valley, Calif. 91352

[22] Filed: Feb. 25, 1975

[21] Appl. No.: 552,986

[52] U.S. Cl. .................................. 53/21 R; 426/234
[51] Int. Cl.² .......................................... B65B 55/16
[58] Field of Search ........... 426/234, 241, 242, 506; 53/127, 21 R

[56] References Cited
UNITED STATES PATENTS

| | | | |
|---|---|---|---|
| 2,233,447 | 3/1941 | Dolman | 426/506 X |
| 2,495,435 | 1/1950 | Welch | 426/234 |
| 3,272,636 | 9/1966 | Fehr et al. | 426/234 |

*Primary Examiner*—Othell M. Simpson
*Assistant Examiner*—Leon Gilden

[57] ABSTRACT

A method is disclosed for extending the shelf life of foods including washing to remove any pesticides which may be present, drying, packaging in a nonporous, sealed container and irradiating with radio frequency electromagnetic waves.

2 Claims, No Drawings

EXTENSION OF SHELF LIFE OF FRESH PRODUCE

This invention relates to improvements in the packaging of produce such that its shelf life is substantially extended. It is particularly useful for products which in their natural state have a protective coating such as a skin or peel; for example, tomatoes, peppers, potatoes, string beans, apples, pears, or citrus fruits. Many other produce items can be similarly packaged.

My packaging method is as follows:

First the produce is washed to remove any pesticides present and allowed to dry.

The produce is then placed in a package or container which is of a nonporous material (essentially airtight) and which is then sealed to keep outside air from reaching the contents. The packaging material which is used should preferably be quite inexpensive and capable of being heat-sealed, such as polyethylene film of adequate thickness or other plastic film material. For marketing purposes it is preferable that the material be transparent to light. An additional property which is essential is that the packaging material used be essentially transparent to radio frequency electromagnetic waves.

The sealed package or container is then irradiated with radio frequency electromagnetic energy. Depending upon the materials used, the preferred frequency may vary. Frequencies from around 20 MHz up to 330 MHz are effective to destroy microorganisms within the film which would otherwise attack the produce and cause it to deteriorate. I have preferred to use a band of frequencies in the neighborhood of 28.5 MHz. In combination with this frequency range, I have found that a band of frequencies in the range of 50 to 200 KHz and preferably at or near 100 KHz has been quite effective in removing certain molds. The packaged produce may be irradiated with these two separate frequency bands at the same time or sequentially, whichever proves more convenient.

The radio frequency may be supplied from a crystal controlled radio frequency generator of conventional design, the output of which is fed into an amplifier which is connected by a shielded cable to an energy chamber. The power level in the energy chamber can be varied to accommodate produce items of varying bulk. I have used power levels from 30 watts to 300 watts depending upon the bulk to be irradiated. While a conventional microwave oven could be used, for large production a conveyor system would be preferable, and I have used a conveyor moving the produce past the energy chamber at a rate of approximately one foot per second. This gives an exposure of approximately one to three seconds to the radiation.

The produce thus packaged and irradiated may be stored and transported as required. It must be kept from freezing, however. Refrigeration may be desirable to retard ripening which will take place after irradiation. Packaging as described makes possible the picking of a more mature product, thus insuring better quality and flavor at the market. Other materials which may be used for packaging include polyester film, acrylic film, or polyvinylidene chloride film.

I claim:

1. A process for the preservation of foods including the steps of:
   1. washing the foods as required to remove any pesticides which may be present,
   2. placing said foods in a container of a material which is essentially airtight but which permits the passage of radio frequency waves therethrough,
   3. sealing said container, and
   4. irradiating said sealed container with a source of radio frequency electromagnetic energy wherein said source is capable of producing a first band of energy in the range of 20 MHz to 330 MHz and a second band of energy in the range of 50 KHz to 200 KHz, said energy being at power levels between thirty watts and three hundred watts.

2. A process for the preservation of foods as set forth in claim 1 wherein the frequency of said first band of energy is substantially 28.5 MHz and the frequency of said second band of energy is substantially 100 KHz.

* * * * *